United States Patent
Iyer et al.

(10) Patent No.: US 7,108,739 B2
(45) Date of Patent: Sep. 19, 2006

(54) EFFICIENTLY REGENERATED PARTICLE TRAP FOR AN INTERNAL COMBUSTION ENGINE AND METHOD OF OPERATING SAME

(75) Inventors: Kartik G. Iyer, Novi, MI (US); Cornelius N. Opris, Peoria, IL (US); Owen C. Kolstad, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 213 days.

(21) Appl. No.: 10/686,468

(22) Filed: Oct. 15, 2003

(65) Prior Publication Data
US 2005/0081494 A1 Apr. 21, 2005

(51) Int. Cl.
*B01D 46/46* (2006.01)

(52) U.S. Cl. .................. 95/283; 55/282.3; 55/287; 55/483; 55/484; 55/DIG. 10; 60/311

(58) Field of Classification Search .......... 55/286, 55/287, 282.2, 309.1, 312, 288, 483, 484, 55/DIG. 10; 95/278, 283; 60/311
See application file for complete search history.

(56) References Cited

U.S. PATENT DOCUMENTS

| | | | | |
|---|---|---|---|---|
| 4,281,512 A | * | 8/1981 | Mills | 60/311 |
| 4,419,113 A | * | 12/1983 | Smith | 55/484 |
| 4,813,231 A | | 3/1989 | Bykowski | |
| 4,894,074 A | * | 1/1990 | Mizrah et al. | 55/482 |
| 4,976,929 A | | 12/1990 | Cornelison et al. | |
| 5,067,318 A | | 11/1991 | Arai | |
| 5,293,742 A | * | 3/1994 | Gillingham et al. | 60/288 |
| 5,454,845 A | * | 10/1995 | Anahara et al. | 55/482.1 |
| 5,458,673 A | * | 10/1995 | Kojima et al. | 95/11 |
| RE35,134 E | | 12/1995 | Mizuno et al. | |

(Continued)

FOREIGN PATENT DOCUMENTS

| | | |
|---|---|---|
| EP | 0 849 444 A2 | 6/1998 |
| EP | 1 270 886 A1 | 1/2003 |

(Continued)

OTHER PUBLICATIONS

Donaldson, INC., Donaldson Exhaust Aftertreatment Systems, pp. 1-2.

(Continued)

*Primary Examiner*—Frank M. Lawrence
(74) *Attorney, Agent, or Firm*—Liell & McNeil

(57) ABSTRACT

Particle traps are often used to reduce particulate emissions from internal combustion engines to acceptable levels. In order to maintain the particulate traps, they must be periodically regenerated in order to burn off the trapped particles. Strategies for efficiently regenerating the particle traps have been elusive. The present invention separates the exhaust flow into several flow paths. During regeneration, the flow paths are sequentially partially closed, and the particle traps in each of the flow paths are individually regenerated using electrically conductive filter elements. The present invention can be used to effectively filter particles from any combustion process, especially exhaust from internal combustion engines. The particle trap assembly achieves a relatively low pressure loss and efficient regeneration by supplying an oxidizer via a small cross-flow passage.

22 Claims, 3 Drawing Sheets

U.S. PATENT DOCUMENTS

| | | |
|---|---|---|
| 5,651,250 A | 7/1997 | Kawamura |
| 5,851,249 A | 12/1998 | Henda et al. |
| 5,961,931 A | 10/1999 | Ban et al. |
| 6,028,296 A | 2/2000 | Yoro et al. |
| 6,167,696 B1 | 1/2001 | Maaseidvaag et al. |
| 6,176,896 B1 * | 1/2001 | Dementhon et al. ........... 95/14 |
| 6,233,926 B1 | 5/2001 | Bailey et al. |
| 6,375,695 B1 * | 4/2002 | Machida et al. ........... 55/282.3 |
| 6,572,682 B1 * | 6/2003 | Peter et al. ................... 95/278 |

FOREIGN PATENT DOCUMENTS

| | | |
|---|---|---|
| WO | WO 01/14696 A1 | 3/2001 |
| WO | WO 02/063146 A2 | 8/2002 |
| WO | WO 03/002854 A1 | 1/2003 |

OTHER PUBLICATIONS

Rypos Advanced Diesel Emission Control Systems, http://www.rypos.com/products.html, Publication 2000, pp. 1-2.

Electrically Regenerated Filters, http://www.dieselnet.com/tech/dpf_electric.html, pp. 1-14.

* cited by examiner

EFFICIENTLY REGENERATED PARTICLE TRAP FOR AN INTERNAL COMBUSTION ENGINE AND METHOD OF OPERATING SAME

TECHNICAL FIELD

The present invention relates generally to particle traps for filtering exhaust from an internal combustion engine, and more particularly to a particle trap assembly with efficient regenerative capabilities.

BACKGROUND

In order to meet the very stringent requirements on exhaust particulate emissions being imposed by governmental regulators, modifications to the engine and/or exhaust treatment strategies are necessary. Although particle traps are known in the art, many employ cordierite as the filter medium, and use some separate regenerator, such as injected fuel or an electrically resistive heater, to regenerate the filter. Although several filter mediums are known in the art that can effectively capture particulate matter in a wide range of particle sizes suitable for treatment of an engine's exhaust, efficiently regenerating the particle traps has been much more problematic. For instance, regenerating particle traps by burning fuel in the exhaust section to create the heat necessary to cause regeneration (i.e. burn the particulate matter) can result in an excess usage of fuel, cause uneven regeneration of the filter medium and potentially create even further undesirable emissions. Likewise, particulate trap strategies that employ an electrically resistive heater embedded in, or positioned adjacent, a filter medium can also experience uneven regenerative heating and can consume relatively large amounts of electrical power to perform the regenerative function.

Existing systems often suffer from additional energy consumption due to the fact that regenerative heaters must heat the filter medium well above typical exhaust temperatures. When regeneration is performed with the engine running, the exhaust flow blowing over the filter medium tends to cool the same. Thus, even larger amounts of heat energy must be supplied to overcome this continuous cooling of the filter medium that occurs due to exhaust gas flow. In addition, many prior assemblies attempt to regenerate almost the entire particulate filter assembly in a single operation, which can also place large energy demands on an engine's electrical system.

The present invention is directed to one or more of the problems set forth above.

SUMMARY OF THE INVENTION

In one aspect, a particle trap assembly includes a plurality of particle traps positioned in a housing. At least one valve is attached to the housing and is moveable between a first position and a second position. A flow area to one of the particle traps is relatively large when the valve is in its first position, but is a relatively small predetermined flow area that is greater than zero when the valve is in its second position.

In another aspect, a particle trap assembly includes a housing with an inlet separated from an outlet by a plurality of flow paths. At least one particle trap separates an upstream portion of one of the flow paths from a downstream portion. A plurality of valves are attached to the housing, and each is operable to open and close a selected one of the flow paths. A plurality of cross flow passages are disposed in the housing and fluidly connect different pairs of the flow paths. Each of the flow paths has a relatively large flow area, and each of the cross flow passages has a relatively small predetermined flow area.

In still another aspect, a method of regenerating a particle trap in a particle trap assembly includes a step of changing a flow area to a particle trap from a relatively large flow area to a relatively small predetermined flow area that is greater than zero. The particle trap is regenerated at least in part by heating the particle trap while supplying an oxidizer via the relatively small predetermined flow area.

In still another aspect, a particle trap assembly includes a housing with a can pressure loss co-efficient for fluid flow between an inlet and an outlet. At least one particle trap is positioned in the housing and has a filter pressure loss coefficient for fluid flow passing through a filter medium. The can pressure loss coefficient is on a same order as the filter pressure loss coefficient.

In another aspect, a particle trap assembly includes a housing. At least one particle trap with an electrically conductive filter element divides the housing into an upstream volume and a downstream volume. The upstream volume is about equal to the downstream volume.

In still another aspect, a method of reducing pressure losses through a particle trap assembly includes a step of separating an upstream volume of the housing from the downstream volume with at least one particle trap having an electrically conductive filter element. The upstream volume is sized relative to the downstream volume so that a can pressure loss coefficient is on a same order as a filter pressure loss coefficient.

DETAILED DESCRIPTION

Figure 1:
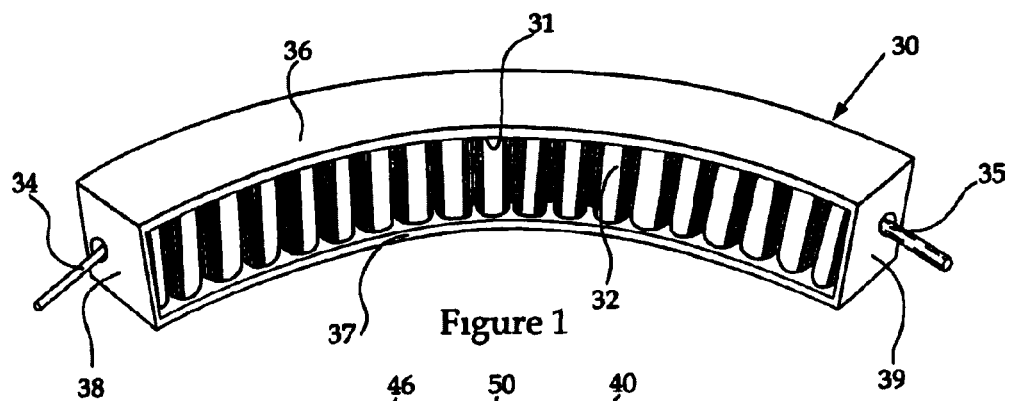
FIG. 1 is an isometric view of a particle trap according to one aspect of the present invention.
Figure 2:
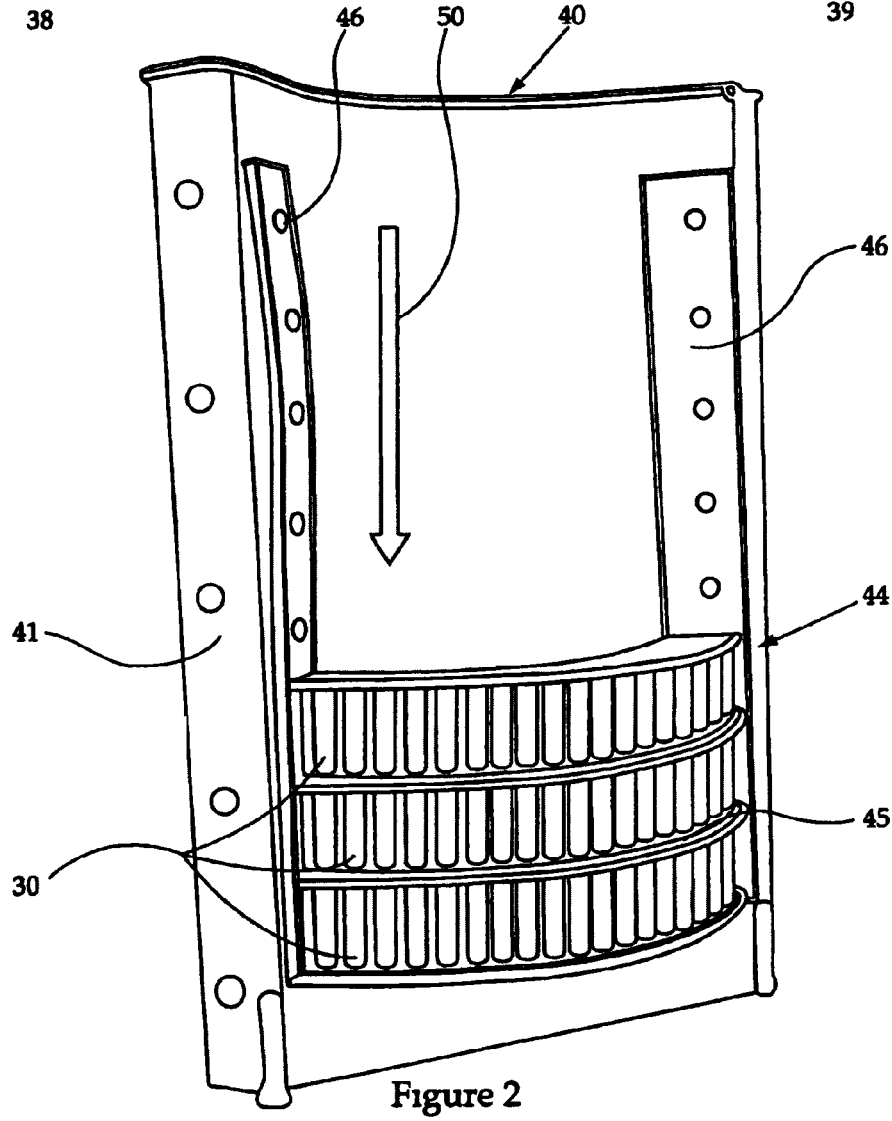
FIG. 2 is an isometric view of a partially assembled particle trap sub-assembly according to another aspect of the present invention.

Referring to FIG. 1, an individual particle trap 30 according to the present invention includes a metallic box that surrounds a conduit 31 and an electrically conductive filter element 32 on four sides. The box is preferably constructed from a suitable corrosion resistant material, such as stainless steel, and includes an arcuate shaped top separated from a like shaped bottom 37 by a pair of sides 38 and 39. Thus, trap 30 can be said to have a long dimension that deviates from a straight line and, the long axis extends between sides 38 and 39, which are angled to one another. Top 36 and bottom 37 preferably have a relatively planar outer surface to facilitate stacking a plurality of particle traps 30, as shown in FIG. 2. The filter element 32 could be of a type manufactured by Bekaert Metal Fiber Technologies of Belgium to include a relatively fine mesh of an alloy of iron, chromium and aluminum that is electrically conductive. In this example, the filter medium comes in an elongated piece that is formed into a serpentine pattern for appropriate sizing in the box of FIG. 1. This serpentine pattern allows for a large filtration surface area in a manner well known in the art. The sides 38 and 39 separate the filter element 32 from electric terminals 34 and 35, respectively. The individual particle trap 30 is regenerated by passing a suitable electric current through the electrically conductive filter element 32 via electric terminals 34 and 35. When a sufficient electric current is passed through electrically conductive filter element 32, it glows red from heat and regenerates the filter by burning off any trapped particulate matter. Preferably, terminals 34 and 35 and the filter element 32 are electrically isolated from the surrounding box using an appropriate insulator, such as by coating the inner surfaces of top 36, bottom 37 and sides 38, 39 with an aluminum oxide coating. The filter element 32 can be secured in the box and attached to the electrical terminals 34 and 35 in any suitable manner known in the art.

Referring now to FIG. 2, a plurality of individual particle traps 30 are stacked atop one another and attached to a housing quadrant 41 in order to produce a particle trap subassembly 40. FIG. 2 shows a particle trap subassembly 40 partially assembled to include three stacked particle traps 30 separated from one another by ceramic mats 45. When subassembly 40 is completely assembled, it will include eight stacked particle traps 30 in this illustrative example embodiment. In order to electrically isolate particle traps 30 from one another, the sides of the particles traps are preferably separated from the housing segment 41 by a pair of ceramic mats 46. Mats 46 preferably include holes to receive the electrical terminals 34 and 35 so that the same are exposed outside of housing segment 41 for connection to an appropriate electrical circuit. In order to further the electrical isolation, the individual particle traps 30 are also preferably separated from one another by suitably shaped ceramic mats 45. When the complete stack 44 of particle traps 30 are attached to housing segment 41, an individual exhaust flow path 50 is bound on one side by the inner surface of housing segment 41 and on its other surface by the stack 44 particle traps 30.

Figure 3:
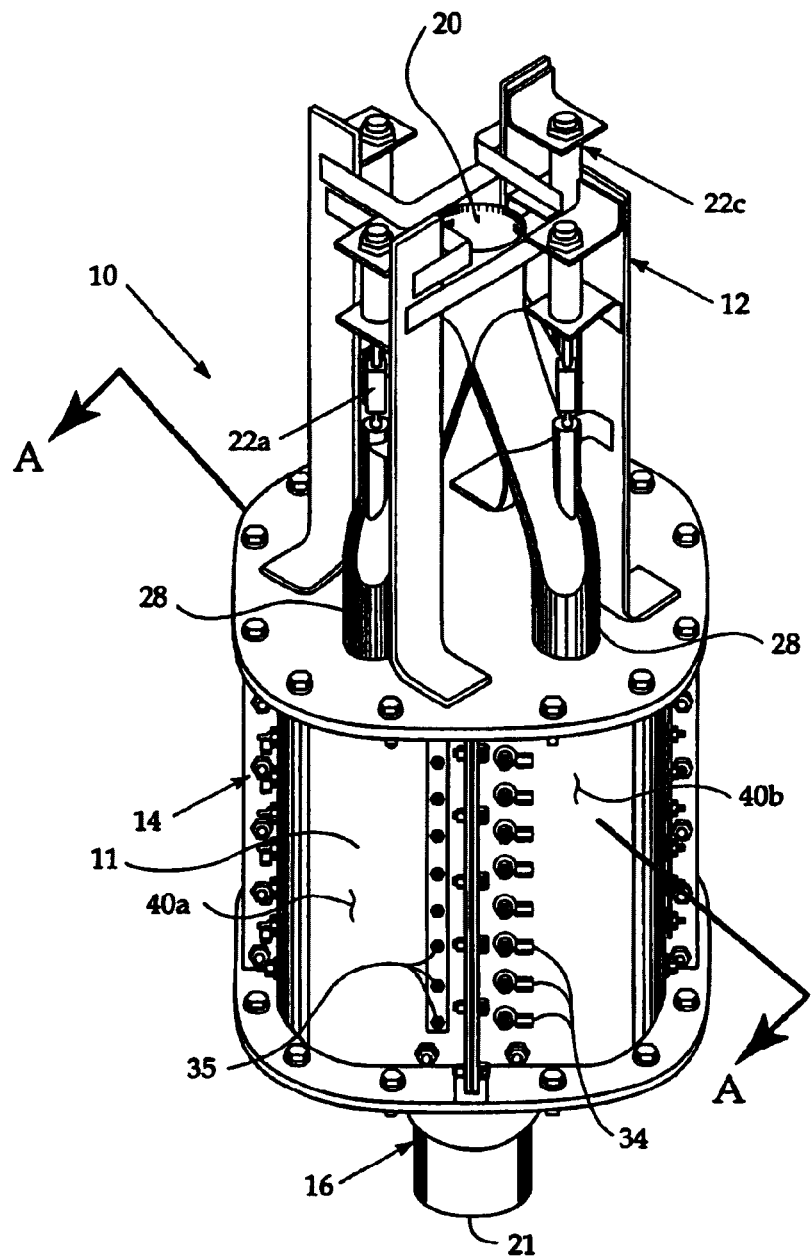
FIG. 3 is an isometric view of a particle trap exhaust section according to another aspect of the present invention.
Figure 4:
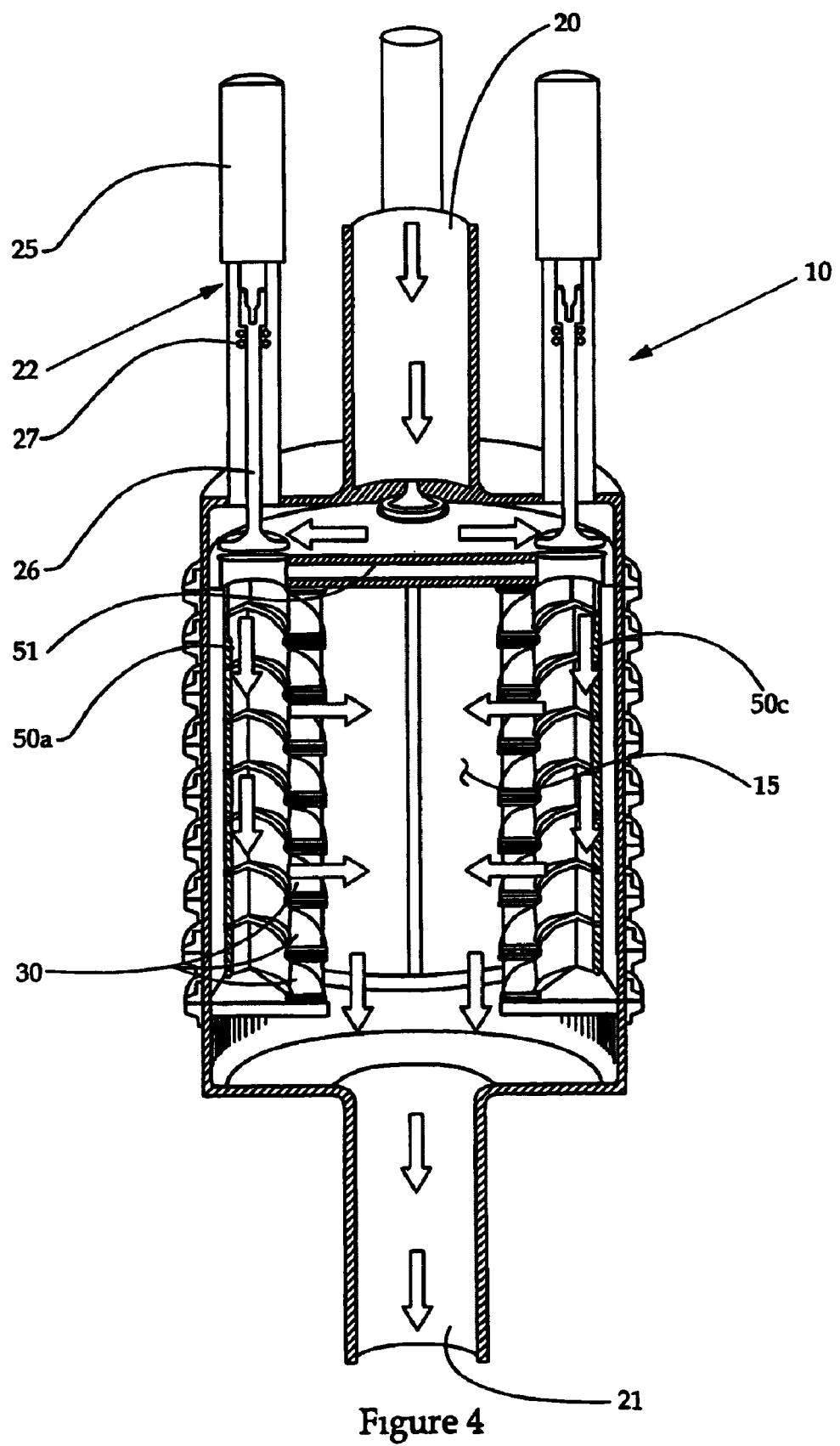
FIG. 4 is a sectioned isometric view of the exhaust section of FIG. 3 as viewed along section lines A—A.

Referring now to FIGS. 3 and 4, a particle trap exhaust section 10 according to the illustrated embodiment includes an inlet section 12 separated from an outlet section 16 by a filter section 14 with an external surface 11. Filter section 14 is made up of four separate particle trap subassemblies 40 which are attached at their flanges in a suitable manner, such as by bolts. Exhaust section 10 preferably includes a suitably sized inlet 20 for a connection to an exhaust pipe from an internal combustion engine, and an outlet 21 for fluid connection to a tail pipe or another exhaust after treatment section from an internal combustion engine. In the illustrated embodiment, the inlet section 12 includes an inlet 20 and four outlets 28, which correspond to the four flow paths 50a–d defined by the four particle trap subassemblies 40. The inlet section 12 and the outlet section 16 are preferably attached to the trap or the filter section 14 via a plurality of bolts located at the perimeter flanges of the respective housing segments 41, or the sections can be welded together. In order to control which of the flow paths 50a–d are open, and which are at least partially closed, the inlet section 12 is provided with an individual flow path valve 22 for each of the flow paths 50a–d. In the preferred embodiment, each of the flow path valves 22 is equipped with a poppet valve member 26, a pneumatic actuator 25 and a biasing spring 27. Preferably, the biasing springs 27 bias the individual valve members 26 toward an open position so that the respective flow path 50 is biased to a normally open position. When compressed air is supplied to pneumatic actuator 25, the individual valve member 26 is driven downward into contact with a seat to close that individual flow path. Those skilled in the art will appreciate that any other type of actuator could be substituted in place of the pneumatic actuators 25 without departing from the intended scope of the present invention. However, the illustrated embodiment is preferably intended for use with on highway trucks, which have compressed air available, for such items as the vehicle's air brakes. The pneumatic actuators 25 would be preferably controlled in a conventional manner via an electronic control module associated with the vehicle and/or engine.

It is important to note that the electrical terminals 34 and 35 of the individual particle traps 30 are preferably exposed on the outside of the external surface 11 of individual particle trap subassemblies 40. Particle traps 30 are positioned in the internal space 15 of filter section 14. This prevents the electrical connections from becoming corroded due to exposure to exhaust flow. In addition, this structure allows for each of the individual particle traps 30 to be placed on a selectively energizable electric circuit of a type well known in the art. In the preferred embodiment, only one flow path 50 is partially closed by a flow path valve 22 at a time, and only one particle trap 30 within that flow path is electrically regenerated at a time.

In order to ensure an adequate supply of oxygen or oxidizer during regeneration of the particle traps in a given flow path, the present invention also preferably includes some means for supplying oxygen in the region where the particle trap is being regenerated. In the illustrated embodiment, this is accomplished by including cross passages 51 that extend between the separate flow paths so that some small amount of exhaust flow continues to flow through a closed flow path during regeneration. For instance, and in reference to FIG. 4, if the valve 26 were closed to partially closed within flow path 50a, some oxygen and/or oxidizer would be supplied to assist in the regeneration of particle traps in that flow path via cross passage 51 that is fluidly connected to flow path 50c. Those skilled in the art will appreciate that supplying oxygen to assist in the regeneration process could be accomplished in a number of ways. For instance, oxygen from the ambient environment could be supplied in some manner known in the art. Another alternative might be to simply have a small passage through the valves 26 so that when they are seated, a small passage remains.

In order to minimize pressure losses through the particle trap assembly of the present invention, the housing is divided into an upstream volume and a downstream volume by the filter medium. By appropriately shaping the housing and the internal particle traps, the upstream flow speed can be made about equal to the downstream flow speed. In the illustrated embodiment, this is accomplished by making the upstream and downstream flow areas about equal. As a result, in the illustrated embodiment the upstream volume is set to be about equal to the downstream volume. By about equal, it means that the upstream volume, speed or flow area is within plus or minus 5% of the downstream volume speed or flow area, or vice versa, respectively. In addition, a can pressure loss coefficient is made to be on the same order as a filter pressure loss coefficient. The can pressure loss coefficient can be determined by known methods, such as by determining a pressure drop through the housing without the filter medium being present. The filter pressure loss coefficient relates to a pressure drop that could be expected for exhaust traversing the filter medium, ignoring pressure losses due to the housing. This can also be determined by known methods of calculation and/or measurement. By utilizing an electrically conductive filter element and shaping the housing as described, the can pressure loss coefficient is preferably on the same order as the filter pressure loss coefficient. Being on the same order means that neither coefficient is greater than ten times the other coefficient. This is accomplished at least in part, by utilizing an electrically conductive filter element while adjusting the relative sizes of the upstream and downstream flow areas and/or volumes within the housing to provide an overall reduction in pressure loss across the particle trap assembly when used to filter exhaust from an internal combustion engine. In other words, the upstream flow speed is made about equal to the downstream flow speed.

INDUSTRIAL APPLICABILITY

The present invention is generally applicable to trapping combustible particles that are typically a bi-product of a combustion process. The invention finds specific applicability to particle traps for internal combustion engines. The invention is illustrated in its preferred application, which relates to particle traps for over the road type trucks, off road vehicles and stationary power generators equipped with diesel engines.

During normal operation, all of the flow path valves 22 are biased toward their normally open position, and exhaust from the engine enters at inlet 20 and is divided substantially evenly between the four outlets 28 of the inlet section 12. As the exhaust flows down each of the flow paths 50a–d, particulates are filtered as the exhaust moves radially inward toward a central passage, then downward and out of the particle trap exhaust section 10 via outlet 21. As the particle traps 30 continue to operate, they collect more and more particles and become more and more clogged. Eventually, the individual traps will become so clogged with particles that they are in need of being regenerated. This condition can be sensed in a conventional manner, such as by use of one or more pressure sensors that can sense pressure in the exhaust gas flow, and that information can be used in a conventional manner to determine the state of the overall particle trap assembly or the state of particle traps in any of the individual flow paths. For instance, by measuring a pressure differential across a stack of particle traps, one can determine whether the particle traps are clogged using formulas and/or empirical data.

When it is determined that one or more of the particle traps are in need of being regenerated, one of the flow path valves 22 is actuated to close that individual flow path 50. By closing the flow path, the relatively cool exhaust gases will not continuously pass through the filter elements, cooling the same, during the regenerative process. In other words, the heat generated in order to regenerate the individual particle traps need not overcome the cooling influence of the exhaust gas flow as in many regenerating particle traps of the past. However, cross passages 51 insure that some minimum amount of exhaust flow continues in the substantially closed flow path in order to provide oxygen or another oxidizer for the regeneration process. In order to avoid undermining the engine's performance, the remaining open flow paths are preferably sized such that no excessive back pressure burden is placed on the engine when one of the flow paths is closed. Thus, although not necessary, the combined flow area of all of the flow paths, when open, is preferably larger than that necessary for effective operation of the engine and particle traps. Thus, regenerating the particle traps 30 should not undermine engine performance. However, the present invention does contemplate the possibility that the overall system could be sized such that some back pressure would be placed upon the engine when one of the flow paths is closed, but this burden would preferably be relatively short in duration, as the particle traps can be regenerated relatively quickly.

After closing one of the flow paths 50, the regenerating process proceeds by selectively energizing an electrical circuit associated with one of the particle traps associated with the closed flow path. This causes the electrically conductive filter element 32 (FIG. 1) to glow brightly with heat, which in turn burns the trapped particles caught in the filter medium. Burning of the trapped particles is further facilitated via oxygen supplied to the substantially closed flow path via the cross passage 51. After some predetermined duration, the electrical energy is ended to that particular particle trap and then another particle trap is regenerated sequentially in a similar manner. Thus, regenerating the particle traps in one flow path in the illustrated embodiment would include selectively energizing an electrical circuit of each of the eight stacked particle traps 44 in some predetermined sequence. After all of the particle traps in that flow path are regenerated, the flow path valve 22 associated with that flow path is de-actuated and allowed to reopen. Next, another flow path is closed by actuating a different flow path valve 22. The individual particle traps 30 in that closed flow path are then regenerated one at a time until the entire stack 44 has been regenerated. Nevertheless, those skilled in the art will appreciate that not all of the particle traps in each flow path need necessarily be regenerated in each regeneration sequence. Thus, in the illustrated embodiment, each of the four flow paths are sequentially closed, and eight individual particle traps are individually regenerated in each of the four flow paths. Thus, the overall process of regenerating the particle trap exhaust section 10 illustrated would include regenerating 32 individual particle traps 30. After all of the of the particle traps 30 are regenerated, all of the flow path valves 22 are returned to their normally biased open positions and filtering of the exhaust flow continues as normal.

Although the present invention has been illustrated in the context of using individual particle traps 30 that include an electrically conductive filter element, those skilled in the art will appreciate that a non-conductive filter element, such as one using a ceramic filter element, could be substituted without departing from the intended scope of the present invention. In addition, although the present invention preferably contemplates heat regenerating the individual filter traps 30 using an electrically conductive filter element, a separate electrically conductive resistive heater could accompany the filter medium without departing from the present invention. For instance, an electrically conductive resistive heater could be imbedded in or positioned adjacent a ceramic filtering element. In addition, the present invention also contemplates generating heat for regenerating the individual particle traps in another manner besides using electricity. For instance, the individual traps could be regenerated by burning fuel in the vicinity of the particle traps in order to regenerate the same.

The present invention is advantageous in that the electrical demands on the engine can be made to acceptable levels due to a number of strategies associated with the present invention. First, less electrical energy is required since the individual particle traps are partially isolated from the exhaust flow during the regenerating process. This avoids the filter elements being cooled by the exhaust flow during the regeneration process. In addition, each particle trap exhaust section is preferably made up of many individual particle traps 30 that may be heat regenerated selectively.

Thus, less power is necessary because only a small fraction of the entire particle trap is regenerated at any given time. This aspect of the invention also makes the individual particle traps potentially serviceable in that one failed individual particle trap could be replaced without affecting the remaining particle traps. Still another advantage of the present invention relates to the fact that the electrical terminals for the individual particle traps are preferably located outside the housing holding those particle traps. This allows the electrical connections to be made away from the corrosive affect of the exhaust flow. This strategy can also facilitate in trouble shooting potential problems associated with the particle traps or the regenerators associated therewith.

Still another advantage of the present invention is accomplished by reducing the overall pressure loss across the particle trap assembly when in operation. This can be accomplished by arranging the particle traps to divide the housing between an upstream volume that is about equal to a downstream volume, and making the upstream flow area about equal to the downstream flow area. The goal being uniform exhaust flow speed upstream and downstream of the particle trap. This avoids energy waste associated with accelerating and/or decelerating the exhaust flow. In addition, by using an electrically conductive filter element, the filter pressure loss coefficient can be set to be on the same order as the can pressure loss coefficient, resulting in overall pressure loss coefficient that is lower than that believed possible with prior art designs. This strategy is accomplished at least in part by utilizing individual particle traps that have a long dimension that deviates from a straight line so that the housing can be divided into four quadrants that each include a plurality of stacked individual particle traps.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A particle trap assembly comprising:
a filter section housing;
a plurality of particle traps positioned in said filter section housing, and each of the particle traps including a box defining a conduit therethrough within which a filter element is positioned;
at least one valve attached to said housing and being movable between a first position and a second position; and
a flow area to one of said particle traps being relatively large when said valve is in said first position, but being a relatively small predetermined flow area that is greater than zero when said valve is in said second position.

2. The particle trap assembly of claim 1 wherein each of said particle traps includes an electrically conductive filter element attached to a pair of electric terminals that each protrude through a side of the box and a wall of said filter section housing such that the electric terminals are exposed outside said filter section housing but not inside the filter section housing.

3. The particle trap assembly of claim 2 including a plurality of subassemblies that each include a plurality of stacked particle traps and one quadrant of said filter section housing; and
each of said subassemblies being detachably attached to two other subassemblies at contacting flanges.

4. The particle assembly of claim 3 including an inlet section and an outlet section connected to opposite ends of said filter section housing; and
wherein said particle traps divide said filter section housing into an upstream volume and a downstream volume, and said upstream volume has a flow area that is about equal to a flow area of said downstream volume.

5. The particle trap assembly of claim 3 wherein said box of each of said particle traps has a long dimension that deviates from a straight line that terminates in end sides positioned adjacent an outer wall of said filter section housing.

6. The particle trap assembly of claim 3 wherein said stacked particle traps are separated and electrically isolated from one another by ceramic mats.

7. A particle trap assembly comprising:
a filter section housing having a plurality of flow paths;
a least one particle trap separating an upstream portion of one of said flow paths from a downstream portion;
a plurality of valves attached to an inlet section, and each being operable to open and close a selected one of said flow paths;
a plurality of cross flow passages disposed in said filter section housing and fluidly connecting different pairs of said flow paths downstream from said valves but upstream from said particle traps; and
each of said flow paths having a relatively large flow area, and each of said cross flow passages having a relatively small predetermined flow area.

8. The particle trap assembly of claim 7 wherein each of said particle traps includes an electrically conductive filter element attached to a pair of electric terminals that each protrude through a side of a box and a wall of said filter section housing such that the electric terminals are exposed outside said filter section housing but not inside said filter section housing.

9. The particle trap assembly of claim 7 including a plurality of subassemblies that each include a plurality of stacked particle traps and one quadrant of said filter section housing; and
each of said subassemblies being detachably attached to two other subassemblies at contacting flanges.

10. The particle assembly of claim 9 including an inlet section and an outlet section connected to opposite ends of said filter section housing; and
wherein said particle traps divide said filter section housing into an upstream volume and a downstream volume, and said upstream volume has a flow area that is about equal to a flow area of a downstream volume.

11. The particle trap assembly of claim 9 wherein each of said particle traps includes a box defining a conduit therethrough, and each said box has a long dimension that deviates from a straight line and terminates in end sides positioned adjacent an outer wall of said filter section housing.

12. The particle trap assembly of claim 9 wherein said stacked particle traps are separated and electrically isolated from one another by ceramic mats.

13. A method of regenerating a particle trap in a particle trap assembly, comprising the steps of:
changing a flow area to one of a plurality of particle traps from a relatively large flow area to a relatively small predetermined flow area that is greater than zero; and
regenerating the one of the particle traps at least in part by heating the one of the particle traps while supplying an oxidizer via the relatively small predetermined flow area, and the heating step includes a step of conducting electricity through an electrically conductive filter medium;

wherein said changing step includes a step of closing a valve; and the supplying step includes supplying exhaust gas via a cross-flow passage located downstream from the valve but upstream from the particle traps.

14. The method of claim 13 wherein said heating step includes a step of sequentially energizing electrical circuits associated with different ones of a plurality of stacked particle traps; and electrically isolating the particle traps from one another.

15. A particle trap assembly comprising:

a filter section housing;

an inlet section and an outlet section connected to opposite ends of said filter section housing;

at least one particle trap with an electrically conductive filter element dividing said filter section housing into an upstream volume and a downstream volume, and each electrically conductive filter element being electrically connected to a separately energizable electric circuit; and said upstream volume having a flow area about equal to a flow area of said downstream volume.

16. The particle trap assembly of claim 15 wherein each of said at least one particle trap includes a box defining a conduit therethrough and a pair of electric terminals that each protrude through a side of the box and a wall of said filter section housing such that the electric terminals are exposed outside said filter section housing but not inside said filter section housing.

17. The particle trap assembly of claim 15 including a plurality of subassemblies that each include a plurality of stacked particle traps and one quadrant of said filter section housing; and each of said subassemblies being detachably attached to two other subassemblies at contacting flanges.

18. The particle trap assembly of claim 16 wherein each said box of said particle traps has a long dimension that deviates from a straight line that terminates in end sides positioned adjacent an outer wall of said filter section housing.

19. The particle trap assembly of claim 17 wherein said stacked particle traps are separated and electrically isolated from one another by ceramic mats.

20. The particle trap assembly of claim 4 having a can pressure loss coefficient on a same order as a filter pressure loss coefficient.

21. The particle trap assembly of claim 20 wherein said box of each of said particle traps has a long dimension that deviates from a straight line that terminates in end sides positioned adjacent an outer wall of said filter section housing.

22. The particle trap assembly of claim 21 wherein said stacked particle traps are separated and electrically isolated from one another and said filter section housing by ceramic mats.

* * * * *